(12) United States Patent
Shibayama et al.

(10) Patent No.: US 9,846,076 B2
(45) Date of Patent: Dec. 19, 2017

(54) SPECTRAL SENSOR

(71) Applicant: HAMAMATSU PHOTONICS K.K., Hamamatsu-shi, Shizuoka (JP)

(72) Inventors: Katsumi Shibayama, Hamamatsu (JP); Takashi Kasahara, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 70 days.

(21) Appl. No.: 14/400,695

(22) PCT Filed: May 8, 2013

(86) PCT No.: PCT/JP2013/062915
§ 371 (c)(1),
(2) Date: Nov. 12, 2014

(87) PCT Pub. No.: WO2013/172230
PCT Pub. Date: Nov. 21, 2013

(65) Prior Publication Data
US 2015/0153224 A1 Jun. 4, 2015

(30) Foreign Application Priority Data

May 18, 2012 (JP) .............................. 2012-114341

(51) Int. Cl.
*G01J 3/26* (2006.01)
*G01J 3/36* (2006.01)
(Continued)

(52) U.S. Cl.
CPC .............. *G01J 3/26* (2013.01); *G01J 3/0259* (2013.01); *G01J 3/0262* (2013.01);
(Continued)

(58) Field of Classification Search
CPC .... G01J 3/26; G01J 3/51; G01J 3/0262; G01J 3/0259; G01J 3/0289; G01J 3/36
See application file for complete search history.

(56) References Cited

U.S. PATENT DOCUMENTS 4,957,371 A 9/1990 Pellicori et al.
5,144,498 A * 9/1992 Vincent ..................... G01J 3/12
250/226
(Continued)

FOREIGN PATENT DOCUMENTS

CN 1065523 10/1992
CN 1498340 5/2004
(Continued)

OTHER PUBLICATIONS

U.S. Office Action dated Jun. 23, 2015 that issued in U.S. Appl. No. 14/400,686 including double patenting rejections at pp. 3-8.
(Continued)

*Primary Examiner* — Tarifur Chowdhury
*Assistant Examiner* — Mohamed K Amara
(74) *Attorney, Agent, or Firm* — Drinker Biddle & Reath LLP

(57) ABSTRACT

A spectroscopic sensor comprises an interference filter unit, a light detection substrate, and a separator. The interference filter unit has a cavity layer and first and second mirror layers opposing each other through the cavity layer and selectively transmits therethrough a predetermined wavelength range of light according to its incident position from the first mirror layer side to the second mirror layer side. The light detection substrate has a light-receiving surface for receiving light transmitted through the interference filter unit and detects the light incident on the light-receiving surface. The separator extends from the cavity layer to at least one of the first and second mirror layers and optically separates the (Continued)

interference filter unit as seen in a predetermined direction intersecting the light-receiving surface.

11 Claims, 16 Drawing Sheets

(51) Int. Cl.
  *G01J 3/02* (2006.01)
  *G01J 3/51* (2006.01)
(52) U.S. Cl.
  CPC ............... *G01J 3/0289* (2013.01); *G01J 3/36* (2013.01); *G01J 3/51* (2013.01)

(56) References Cited

U.S. PATENT DOCUMENTS

| | | | | |
|---|---|---|---|---|
| 5,784,507 | A | 7/1998 | Holm-Kennedy et al. | |
| 6,898,451 | B2* | 5/2005 | Wuori | A61B 5/1455 600/310 |
| 7,274,011 | B2* | 9/2007 | Tennant | G01J 3/2823 250/226 |
| 7,310,153 | B2* | 12/2007 | Kiesel | G01J 9/0246 356/454 |
| 7,317,216 | B2* | 1/2008 | Holm-Kennedy | G01N 33/54373 257/253 |
| 7,386,199 | B2* | 6/2008 | Schmidt | B01L 3/502715 385/14 |
| 7,426,040 | B2* | 9/2008 | Kim | B82Y 20/00 356/519 |
| 7,718,948 | B2* | 5/2010 | Kiesel | G01J 3/02 250/208.2 |
| 7,852,490 | B2* | 12/2010 | Kiesel | A61B 5/14532 356/519 |
| 8,324,560 | B2* | 12/2012 | Schulz | G01J 3/26 250/208.2 |
| 8,437,582 | B2* | 5/2013 | Kiesel | G01J 3/02 385/12 |
| 8,629,981 | B2* | 1/2014 | Martini | G01N 21/05 356/28 |
| 9,273,999 | B2* | 3/2016 | Kasahara | G01J 3/36 |
| 9,389,412 | B2* | 7/2016 | Matsushita | G02B 26/001 |
| 2003/0173504 | A1 | 9/2003 | Cole et al. | |
| 2005/0013000 | A1 | 1/2005 | Uehara | |
| 2010/0022840 | A1 | 1/2010 | Yasuda | |
| 2011/0199617 | A1* | 8/2011 | Shinto | G02B 26/001 356/519 |
| 2012/0044491 | A1* | 2/2012 | Urushidani | G01J 3/0294 356/326 |
| 2012/0109584 | A1 | 5/2012 | Urushidani | |
| 2012/0120402 | A1* | 5/2012 | Hirokubo | G01J 3/26 356/450 |
| 2013/0153139 | A1 | 6/2013 | Shibayama et al. | |
| 2014/0253923 | A1* | 9/2014 | Shibayama | G01J 3/26 356/451 |
| 2014/0268344 | A1* | 9/2014 | Arakawa | G01J 3/26 359/580 |
| 2014/0293287 | A1 | 10/2014 | Hirao | |
| 2015/0138640 | A1* | 5/2015 | Matsushita | G02B 5/22 359/578 |

FOREIGN PATENT DOCUMENTS

| | | |
|---|---|---|
| CN | 1518660 | 8/2004 |
| CN | 1888833 | 1/2007 |
| CN | 101622517 | 1/2010 |
| CN | 101680804 | 3/2010 |
| CN | 101970993 | 2/2011 |
| CN | 102027342 | 4/2011 |
| JP | S53-39784 A | 4/1978 |
| JP | S57-151830 A | 9/1982 |
| JP | S58-195127 A | 11/1983 |
| JP | S59-72861 A | 4/1984 |
| JP | S62-170647 U | 10/1987 |
| JP | S62-267623 A | 11/1987 |
| JP | S64-35325 A | 2/1989 |
| JP | H02-502490 A | 8/1990 |
| JP | H05-322653 A | 12/1993 |
| JP | H06-120462 A | 4/1994 |
| JP | H06-129908 A | 5/1994 |
| JP | H10-078353 | 3/1998 |
| JP | 2005-037762 A | 2/2005 |
| JP | 2006-058301 A | 3/2006 |
| JP | 2006-284474 A | 10/2006 |
| JP | 2008-232843 | 10/2008 |
| JP | 2011-203247 A | 10/2011 |
| WO | WO 03/091676 | 11/2003 |
| WO | WO 2012/070302 | 5/2012 |

OTHER PUBLICATIONS

English-language translation of International Preliminary Report on Patentability (IPRP) dated Nov. 27, 2014 that issued in WO Patent Application No. PCT/JP2013/062953.

English-language translation of International Preliminary Report on Patentability (IPRP) dated Nov. 27, 2014 that issued in WO Patent Application No. PCT/JP2013/062915.

English-language translation of International Preliminary Report on Patentability (IPRP) dated Nov. 27, 2014 that issued in WO Patent Application No. PCT/JP2013/062919.

\* cited by examiner (a)

(b)

(a)

(b)

(a)

(b)

(a)

(b)

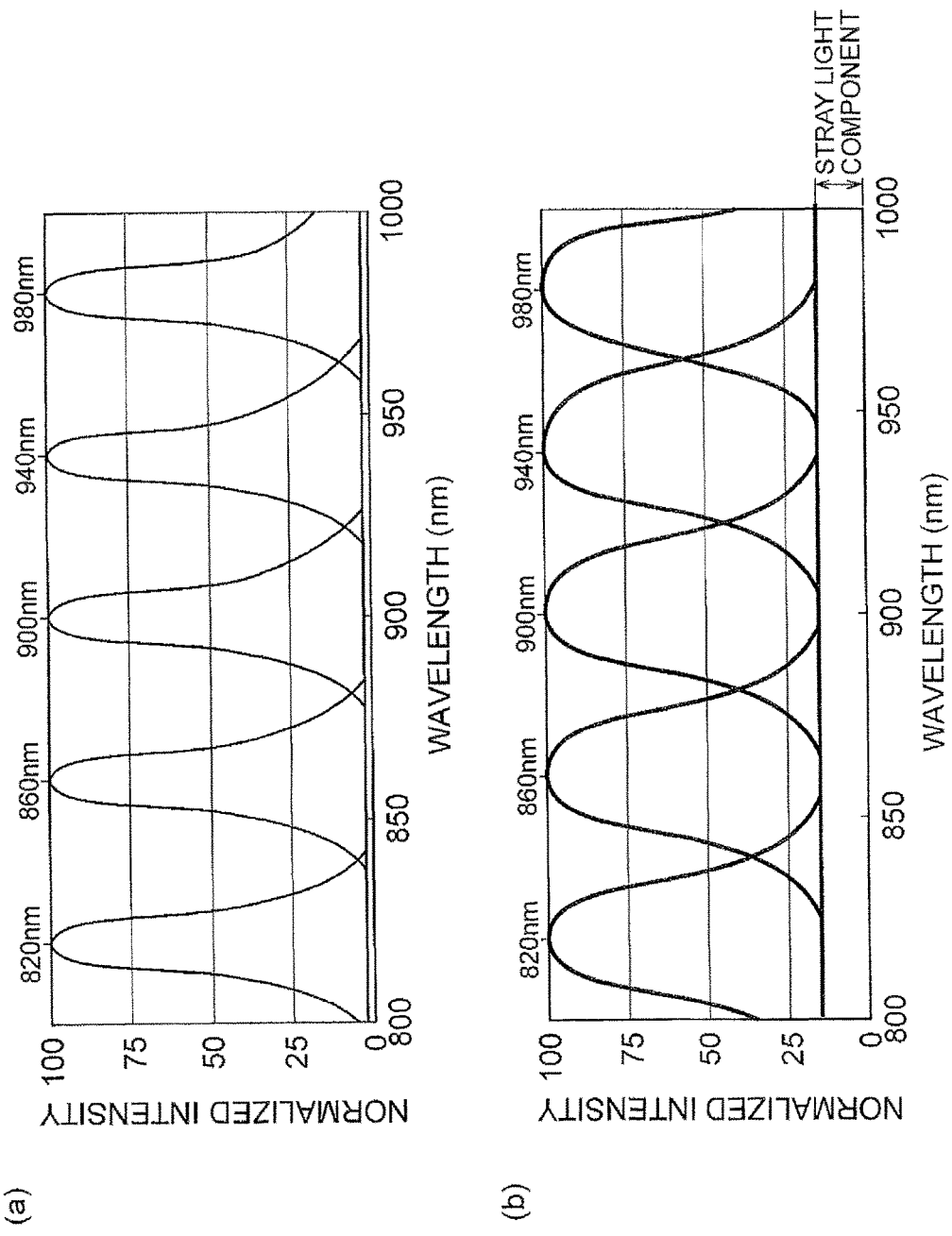

SPECTRAL SENSOR

TECHNICAL FIELD

The present invention relates to a spectroscopic sensor.

BACKGROUND ART

Known as a conventional spectroscopic sensor is one comprising an optical filter unit for selectively transmitting therethrough a predetermined wavelength range of light according to an incident position thereof and a light detection substrate for detecting the light transmitted through the optical filter unit. In a spectroscopic sensor disclosed in Patent Literature 1, for example, an FOP (Fiber Optic Plate) is arranged between the optical filter unit and the light detection substrate or on the side where light is incident on the optical filter unit. In a spectroscopic sensor disclosed in Patent Literature 2, an angle restriction filter for restricting the incident angle of light is provided between the optical filter unit and the light detection substrate.

CITATION LIST

Patent Literature

Patent Literature 1: Japanese Patent Application Laid-Open No. H06-129908
Patent Literature 2: Japanese Patent Application Laid-Open No. 2011-203247

SUMMARY OF INVENTION

Technical Problem

The spectroscopic sensor in which the FOP is arranged between the optical filter unit and the light detection substrate in the spectroscopic sensors disclosed in Patent Literature 1 and the spectroscopic sensor disclosed in Patent Literature 2 suppress crosstalk of light in a region between the optical filter region and the light detection substrate. In the spectroscopic sensors disclosed in Patent Literature 1, the one in which the FOP is arranged on the side where the light is incident on the optical filter unit restrains the incident angle of light incident on the optical filter unit, thereby suppressing the crosstalk of light in the optical filter unit. However, these spectroscopic sensors do not fully suppress the crosstalk of light in the optical filter unit, whereby filter characteristics may deteriorate such that the wavelength range of light detected at a predetermined position of the light-receiving surface of the light detection substrate becomes wider or stray light components increase.

It is therefore an object of the present invention to provide a spectroscopic sensor which can improve filter characteristics.

Solution to Problem

The spectroscopic sensor of the present invention comprises an interference filter unit, having a cavity layer and first and second mirror layers opposing each other through the cavity layer, for selectively transmitting therethrough a predetermined wavelength range of light according to an incident position thereof from the first mirror layer side to the second mirror layer side; a light detection substrate, having a light-receiving surface for receiving the light transmitted through the interference filter unit, for detecting the light incident on the light-receiving surface; and a separator, extending from the cavity layer to at least one of the first and second mirror layers, for optically separating the interference filter unit as seen in a predetermined direction intersecting the light-receiving surface.

In this spectroscopic sensor, the interference filter unit is optically separated by the separator as seen in a predetermined direction intersecting the light-receiving surface, while the separator extends from the cavity layer to at least one of the first and second mirror layers. This restrains light from propagating to directions parallel to the light-receiving surface in the cavity layer even when a structure for restricting the incident angle of light incident on the interference filter unit is not employed separately from the separator, whereby the crosstalk of light in the interference filter unit can fully be suppressed. In addition, the separator restricts the incident angle of light incident on the light-receiving surface of the light detection substrate, whereby light can be made incident on the light-receiving surface accurately at a predetermined position corresponding to the incident position of the interference filter unit. Hence, this spectroscopic sensor can improve filter characteristics.

Here, the separator may extend from the cavity layer to at least the second mirror layer. This structure can restrain stray light from occurring due to multireflection and interference of light between the second mirror layer and the light-receiving surface of the light detection substrate, thereby further improving filter characteristics.

The separator may extend from the cavity layer to both of the first and second mirror layers. While this structure can restrain stray light from occurring due to multireflection and interference of light between the second mirror layer and the light-receiving surface of the light detection substrate, the separator securely separates the cavity layer, whereby crosstalk of light can be suppressed more fully in the interference filter unit.

The spectroscopic sensor may further comprise a first coupling layer, arranged between the interference filter unit and the light detection substrate, for transmitting therethrough light advancing from the interference filter unit to the light detection substrate, while the separator may reach the first coupling layer through the second mirror layer. While this structure can restrain stray light from occurring due to multireflection and interference of light between the second mirror layer and the light-receiving surface of the light detection substrate, the separator more strictly restricts the incident angle of light incident on the light-receiving surface of the light detection substrate, whereby light can be made incident on the light-receiving surface more accurately at a predetermined position corresponding to the incident position of the interference filter unit.

The spectroscopic sensor may further comprise a light-transmitting substrate for transmitting therethrough the light incident on the interference filter unit and a second coupling layer, arranged between the light-transmitting substrate and the interference filter unit, for transmitting therethrough the light advancing from the light-transmitting substrate to the interference filter unit, the separator reaching the second coupling layer through the first mirror layer. In this structure, the separator restricts the incident angle of light incident on the interference filter unit, whereby crosstalk of light can be suppressed more fully in the interference filter unit.

Here, the cavity layer and second coupling layer may be made of the same material. This structure can easily achieve a step of stacking the cavity layer and second coupling layer. When providing the separator by dry etching, for example, the same condition can be employed for etching gases and the like, whereby the separator can be attained with a high form accuracy. Since they have the same refractive index, stable filter characteristics can also be obtained. This can also homogenize collimating characteristics of the separator for restricting the incident angle of light. By "the same" is meant not only completely the same but also substantially the same within ranges of errors in manufacture and the like.

The distance in the predetermined direction between the first and second mirror layers may vary, the distance in the predetermined direction between an end part on the light-receiving surface side of the separator and the light-receiving surface may be fixed, and the distance in the predetermined direction between an end part of the separator on the side opposite from the light-receiving surface and the light-receiving surface may be fixed. This can homogenize collimating characteristics of the separator for restricting the incident angle of light. By "fixed" is meant not only completely fixed but also substantially fixed within ranges of errors in manufacture and the like.

The separator may exist such as to traverse the light-receiving surface as seen in the predetermined direction. This structure makes it possible to detect appropriately-dispersed light (i.e., light having a narrow wavelength range and less stray light components) in the whole region of the light-receiving surface.

The spectroscopic sensor may further comprise an anti-reflection film, arranged between the interference filter unit and the light detection substrate, for preventing the light incident on the light-receiving surface from being reflected. Alternatively, the surface on the interference filter unit side of the light detection substrate may be provided with anti-reflection processing for preventing the light incident on the light-receiving surface from being reflected. These structures can restrain stray light from occurring due to multireflection and interference of light between the second mirror layer and the light-receiving surface of the light detection substrate, thereby further improving filter characteristics.

The predetermined direction may be a direction perpendicular to the light-receiving surface. This configuration can simplify the structure of the spectroscopic sensor.

Advantageous Effects of Invention

The present invention can provide a spectroscopic sensor which can improve filter characteristics.

BRIEF DESCRIPTION OF DRAWINGS

FIG. 16 is a set of graphs illustrating relationships between the wavelength of light and the signal intensity outputted from spectroscopic sensors irradiated with emission lines at 820 nm, 860 nm, 900 nm, 940 nm, and 980 nm.

DESCRIPTION OF THE EMBODIMENTS

Figure 1:
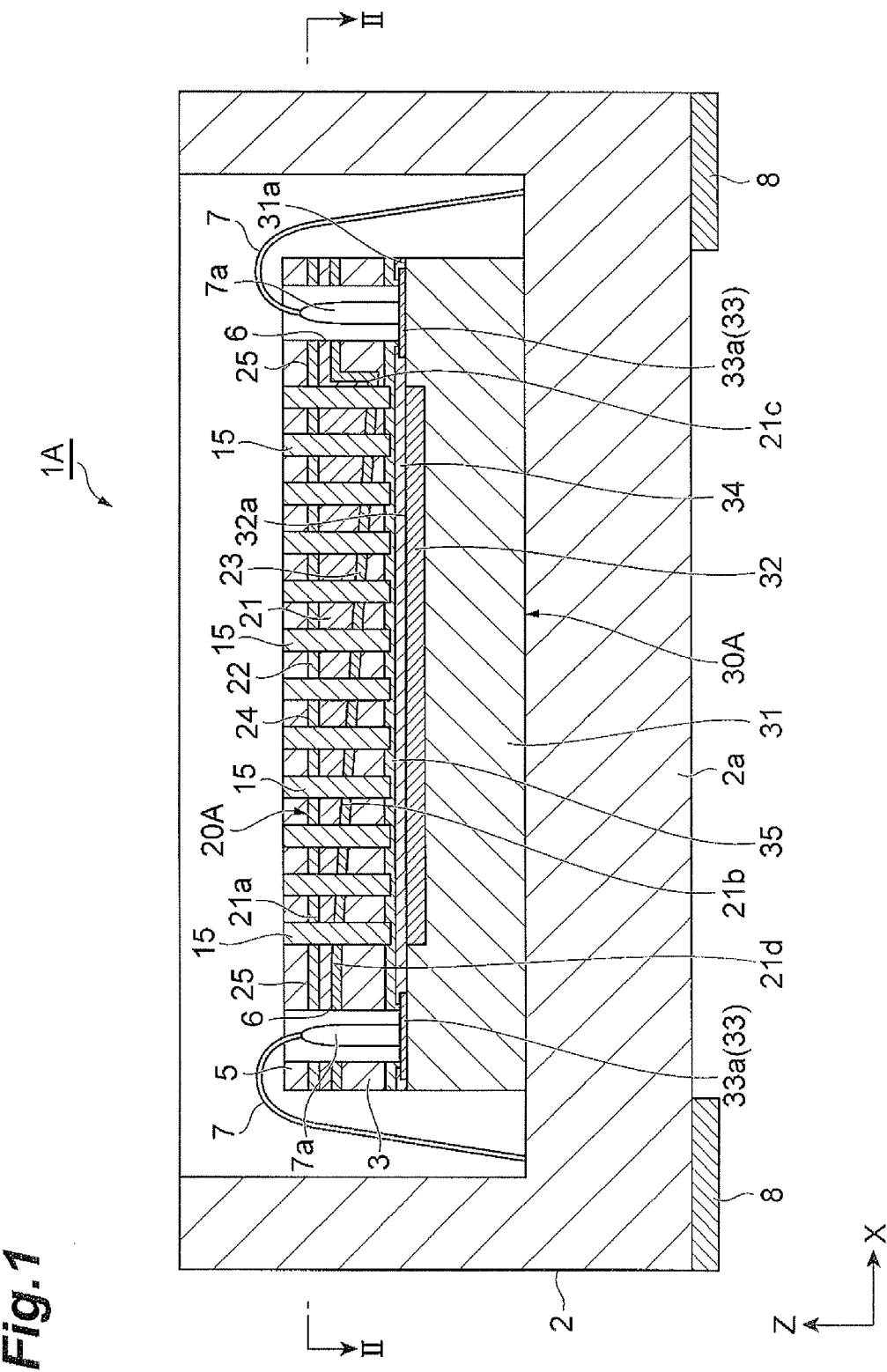
FIG. 1 is a vertical sectional view of the spectroscopic sensor in accordance with a first embodiment of the present invention.

In the following, preferred embodiments of the present invention will be explained in detail with reference to the drawings. In the drawings, the same or equivalent parts will be referred to with the same signs while omitting their overlapping descriptions.

First Embodiment

As illustrated in FIG. 1, a spectroscopic sensor 1A of the first embodiment comprises an interference filter unit 20A, a light detection substrate 30A, and a package 2 containing the interference filter unit 20A and light detection substrate 30A. The package 2 is formed from a resin or the like into a rectangular parallelepiped box and opens on one side (the light entrance side of the interference filter unit 20A and light detection substrate 30A) in the height direction. In the following explanation, X, Y, and Z axes are set in the length, width, and height directions of the package 2, respectively.

The light detection substrate 30A is secured onto a bottom wall 2a within the package 2. The interference filter unit 20A is joined onto the light detection substrate 30A with a first coupling layer 3 interposed therebetween. Between the interference filter unit 20A and the light detection substrate 30A, the first coupling layer 3 transmits therethrough light advancing from the interference filter unit 20A to the light detection substrate 30A. A protective film 5 is formed on the interference filter unit 20A. For example, the first coupling layer 3 is a silicon oxide film formed by film-forming processing using TEOS (Tetraethyl Orthosilicate, Tetraethoxysilane) as a material gas and has a thickness on the order of several tens of nm to several tens of μm. The protective film 5 is made of $SiO_2$ or the like and has a thickness on the order of several tens of nm to several tens of μm.

The light detection substrate 30A is a semiconductor light-receiving element having a semiconductor substrate 31 shaped into a rectangular plate whose longitudinal and thickness directions lie along the X and Z axes, respectively. A light-receiving unit 32 is formed in a part including a surface 31a on one side of the semiconductor substrate 31. The light-receiving unit 32 is a photodiode array in which linear photodiodes each extending along the Y axis are arranged one-dimensionally along the X axis. The light-receiving unit 32 has a light-receiving surface 32a on which light transmitted through the interference filter unit 20A is incident, while the light detection substrate 30A is constructed such as to detect the light incident on the light-receiving surface 32a. For example, the semiconductor substrate 31 has a thickness on the order of several tens of µm to several hundreds of µm. The light-receiving unit 32 has a length along the X axis on the order of several hundreds of µm to several tens of mm and a width along the Y axis of several µm to several tens of mm. The light detection substrate 30A may also be any of other semiconductor light-receiving elements (C-MOS image sensors, CCD image sensors, infrared image sensors, and the like).

Pad units 33a for leads 33 for inputting and outputting electric signals with respect to the light-receiving unit 32 are formed on the surface 31a of the semiconductor substrate 31. An antireflection film 34 is formed on the surface 31a of the semiconductor substrate 31 so as to cover the light-receiving unit 32 and leads 33, while a planarization layer 35 whose surface on the interference filter unit 20A side is planarized by CMP (Chemical Mechanical Polishing) is formed on the protective film 34. Between the interference filter unit 20A and the light detection substrate 30A, the antireflection film 34 prevents the light incident on the light-receiving surface 32a from being reflected. For example, the antireflection film 34 is a single-layer film or multilayer film made of $Al_2O_3$, $TiO_2$, $Ta_2O_5$, $SiO_2$, SiN, $MgF_2$, or the like and has a thickness on the order of several tens of nm to several tens of µm. The protective film 34 is made of $SiO_2$ or the like and has a thickness on the order of several tens of nm to several tens of µm. The planarization layer 35 is made of $SiO_2$ or the like and has a thickness on the order of several tens of nm to several tens of µm.

The interference filter unit 20A has a cavity layer 21 and first and second mirror layers 22, 23 opposing each other through the cavity layer 21. The interference filter unit 20A is an LVF (Linear Variable Filter) which selectively transmits therethrough a predetermined wavelength range of light according to an incident position thereof from the first mirror layer 22 side to the second mirror layer 23 side. For example, the cavity layer 21 is a silicon oxide film ($SiO_2$ film) formed by thermally oxidizing silicon and has a thickness on the order of several tens of nm to several tens of µm. Each of the mirror layers 22, 23 is a DBR (Distributed Bragg Reflector) layer constituted by a dielectric multilayer film made of Si, Ge, SiN, $SiO_2$, $TiO_2$, $Ta_2O_5$, $Nb_2O_5$, $Al_2O_3$, $MgF_2$, and the like and has a thickness on the order of several tens of nm to several tens of µm.

Figure 2:
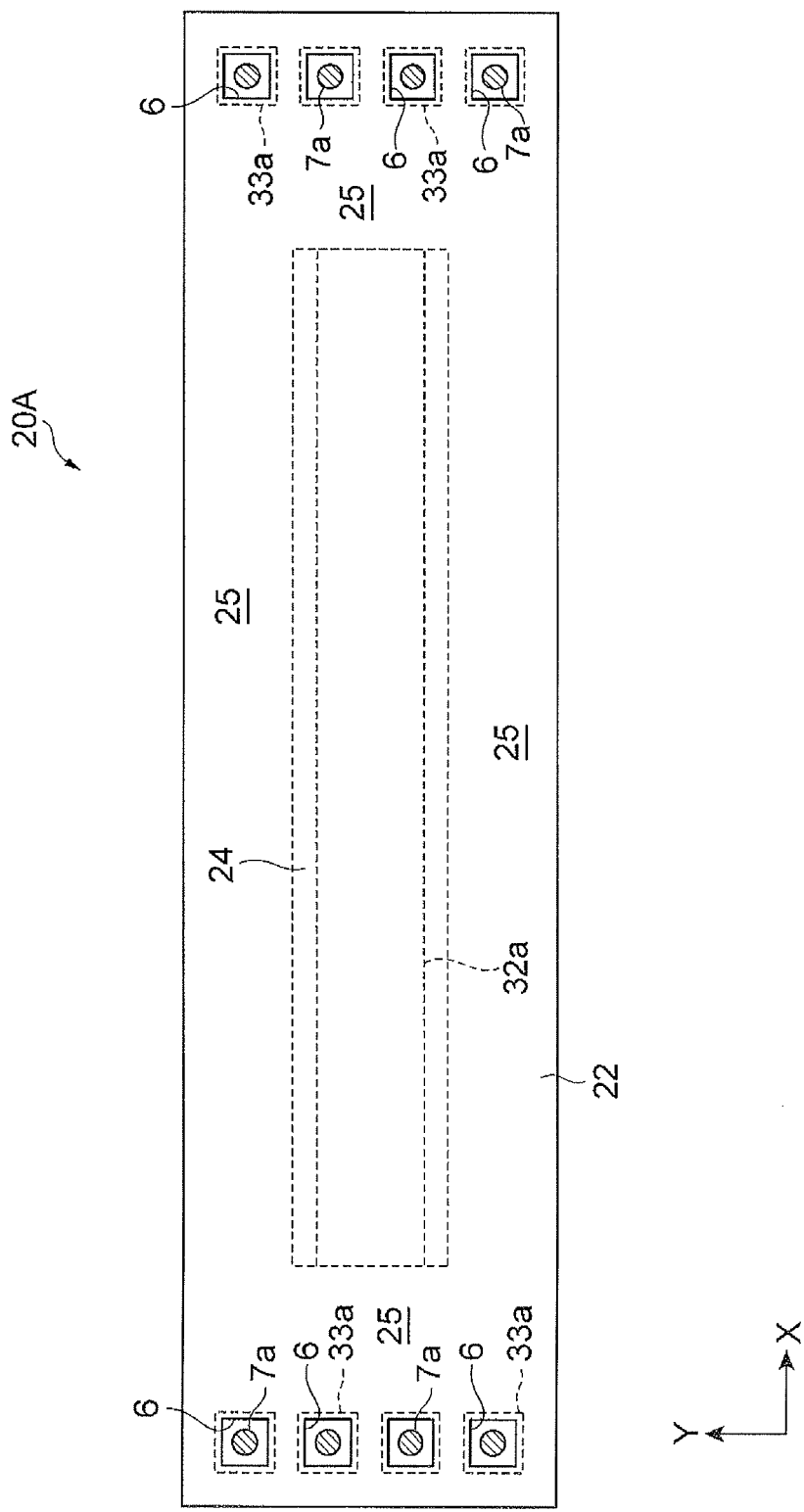
FIG. 2 is a partly sectional view taken along the line II-II of FIG. 1.

As illustrated in FIGS. 1 and 2, the interference filter unit 20A has a first filter region 24 and a second filter region 25. The first filter region 24 corresponds to the light-receiving surface 32a of the light detection substrate 30 as seen in the Z axis (a direction perpendicular to the light-receiving surface 32a). That is, the first filter region 24 and light-receiving surface 32a are formed such that one of them contains the other as seen in the Z axis (encompassing a case where they are equal to each other in terms of at least one of the length along the X axis and width along the Y axis). The second filter region 25 surrounds the first filter region 24 like a ring (a rectangular ring here) as seen in the Z axis.

As illustrated in FIG. 1, the front face 21a of the cavity layer 21 in the first filter region 24 is parallel to the XY plane. On the other hand, the rear face 21b of the cavity layer 21 in the first filter region 24 tilts from the XY plane such that one end 21c in the X-axis direction of the rear face 21b is closer to a plane including the light-receiving surface 32a (e.g., the surface 31a of the semiconductor substrate 31) more than is the other end 21d in the X-axis direction of the rear face 21b. For example, the thickness of the cavity layer 21 in the first filter region 24 gradually increase toward one side in the X-axis direction within the range on the order of several tens of nm to several µm.

The front face 21a and rear face 21b of the cavity layer 21 in the second filter region 25 are parallel to the XY plane. The distance along the Z axis (which will hereinafter be simply referred to as "distance") from the plane including the light-receiving surface 32a to the front face 21a of the cavity layer 21 in the second filter region 25 equals the distance from the plane including the light-receiving surface 32a to the front face 21a of the cavity layer 21 in the first filter region 24. On the other hand, the distance from the plane including the light-receiving surface 32a to the rear face 21b of the cavity layer 21 in the second filter region 25 equals the distance from the plane including the light-receiving surface 32a to the other end 21d of the rear face 21b of the cavity layer 21 in the first filter region 24.

As in the foregoing, the cavity layer 21 is formed continuously over the first and second filter regions 24, 25. The front face 21a of the cavity layer 21 is flush in the first and second filter regions 24, 25. On the other hand, the rear face 21b of the cavity layer 21 has a difference in level between the first and second filter regions 24, 25 which becomes the largest at one end 21c and the smallest (0 here) at the other end 21d. The thickness of the cavity layer 21 at the rear face 21b is about 500 nm.

The first mirror layer 22 is formed continuously on the front face 21a of the cavity layer 21 over the first and second filter regions 24, 25. On the other hand, the second mirror layer 23 is formed continuously on the rear face 21b of the cavity layer 21 and the vertical surfaces of the difference in level (risers) over the first and second filter regions 24, 25. Hence, the distance between the first and second mirror layers 22, 23 varies in the first filter region 24. The distance between the first and second mirror layers 22, 23 is fixed in the second filter region 25.

Figure 3:
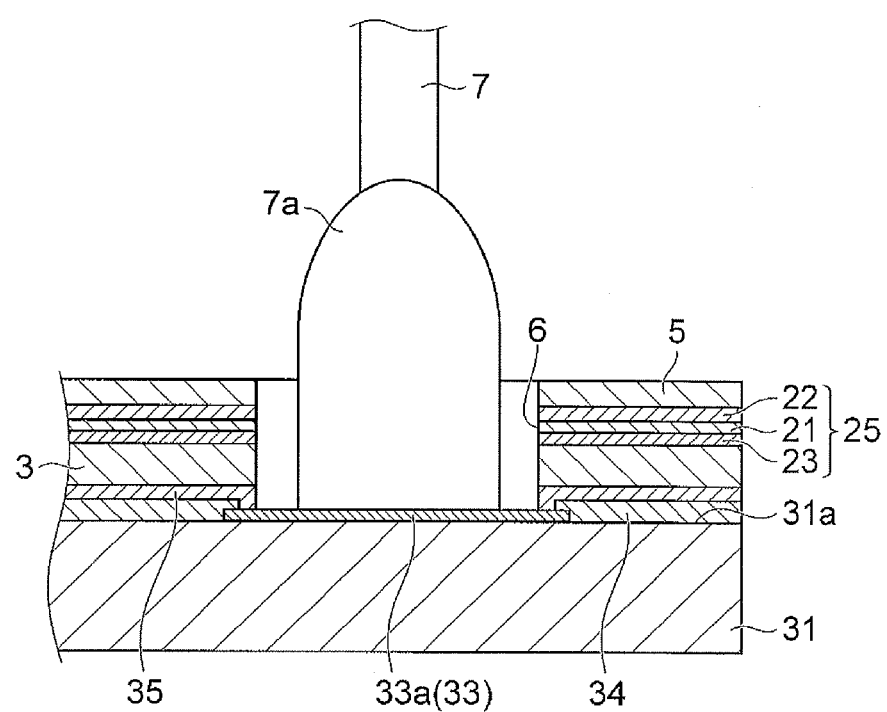
FIG. 3 is an enlarged vertical sectional view of a pad unit and parts thereabout in the spectroscopic sensor of FIG. 1.

As illustrated in FIGS. 1 and 2, a plurality of pad units 33a for the leads 33 in the light detection substrate 30 are formed on the surface 31a of the semiconductor substrate 31 so as to be contained in the second filter region 25 as seen in the Z axis. More specifically, a plurality of pad units 33a are provided in a row along the Y axis in each of both end regions in the X-axis direction of the surface 31a. As illustrated in FIGS. 1 and 3, a plurality of through holes 6 for exposing the pad units 33a to the outside are formed in the second filter region 25 for the respective pad units 33a. Each through hole 6 penetrates through the antireflection film 34, planarization layer 35, first coupling layer 3, second filter region 25 (i.e., the cavity layer 21 and first and second mirror layers 22, 23), and protective film 5 along the Z axis, so as to expose a part (or whole) of the pad unit 33a to the outside. Since FIG. 1 emphasizes the thickness of each layer, FIGS. 1 and 3 differ from each other in their aspect ratios, so that FIG. 3 is closer to the actual aspect ratio than FIG. 1. The opening edge of the protective film 34, which is on the outer side of that of the other layers (the planarization layer 35, first coupling layer 3, second filter region 25, and protective film 5) in the structure of FIGS. 1 to 3, may be located at the same position as with the latter as seen in the Z axis.

A wire 7 is connected to each pad unit 33a through the through hole 6. For example, the wire 7 is made of Au and has one end with a ball part 7a which is bonded to the surface of the pad unit 33a under thermocompression while being provided with ultrasonic vibrations. A gap is formed between the inner surface of the through hole 6 and the ball part 7a in order to prevent the second filter region 25 and the like from being damaged in contact with the ball part 7a. The other end of the wire 7 is connected through the bottom wall 2a of the package 2 to a mounting pad unit 8 disposed on the outer surface of the bottom wall 2a.

Figure 4:
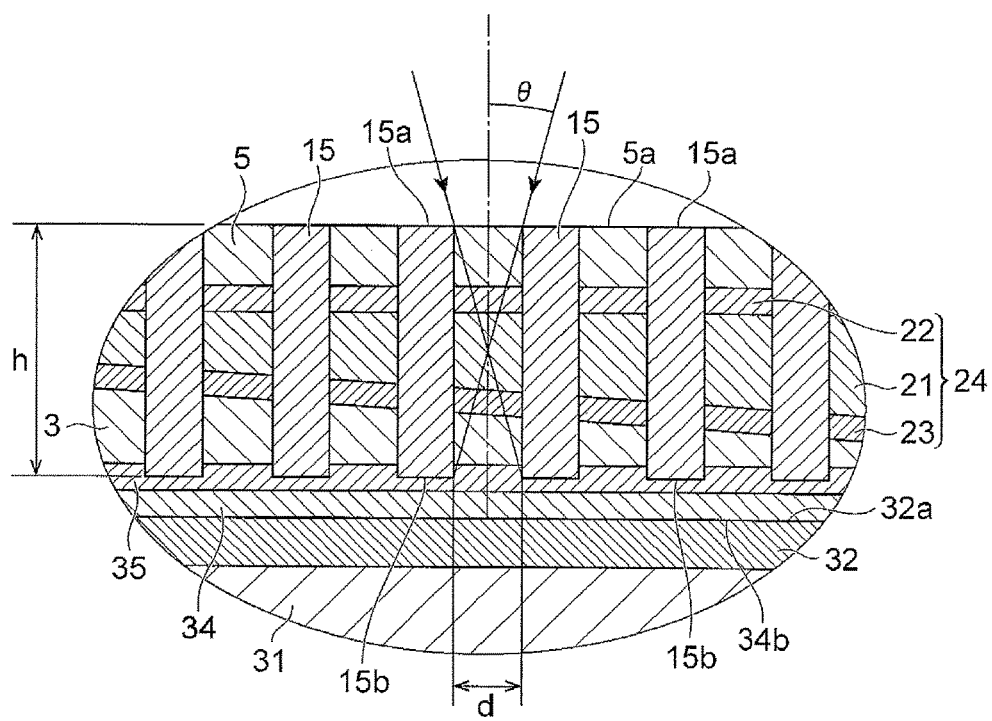
FIG. 4 is an enlarged vertical sectional view of a center part of an interference filter unit in the spectroscopic sensor of FIG. 1.
Figure 4:
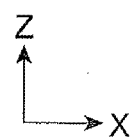

As illustrated in FIGS. 1 and 4, separators 15 each extending along the Y axis are arranged one-dimensionally along the X axis. The separators 15 have a light-absorbing, reflecting, or shielding property and optically separate the first filter region 24 of the interference filter unit 20A as seen in the Z axis. For example, the separators 15 are made of W, Al, Cu, Si, or a light-absorbing resin. Each separator 15 has a width along the X axis on the order of several μm to several tens of μm, a width along the Z axis on the order of 1 μm to several hundreds of μm, and an aspect ratio on the order of 1 to several hundreds in a cross section (parallel to the ZX plane) thereof.

Each separator 15 extends such as to traverse the light-receiving surface 32a of the light detection substrate 30A as seen in the Z axis. When thus extending to traverse the light-receiving surface 32a, each separator 15 may reach side faces of the spectroscopic sensor 1A or not. Each separator 15 extends from the cavity layer 21 to the front face 5a of the protective film 5 through the first mirror layer 22. On the other hand, each separator 15 extends from the cavity layer 21 to the middle of the planarization layer 35 through the second mirror layer 23 and first coupling layer 3. The distance between an end part 15a of each separator 15 on the side opposite from the light-receiving surface 32a and the light-receiving surface 32a is fixed. Similarly, the distance between an end part 15b of each separator 15 on the light-receiving surface 32a side and the light-receiving surface 32a is fixed. The end part 15b of each separator 15 may be located at the interface between the rear face 34b of the antireflection film 34 and the light-receiving surface 32a.

Light entering the package 2 through the opening thereof in thus constructed spectroscopic sensor 1A, if any, passes through the protective film 5, so as to be made incident on the first filter region 24 of the interference filter unit 20A, whereby a predetermined wavelength range of light is selectively transmitted therethrough according to its incident position. The light transmitted through the first filter region 24 passes through the first coupling layer 3, planarization layer 35, and antireflection film 34, so as to be made incident on the light-receiving surface 32a of the light detection substrate 30A. Here, the wavelength range of light incident on each channel of the light-receiving unit 32 of the light detection substrate 30A is determined uniquely by the thickness of the cavity layer 21 at the incident position and the materials and thicknesses of the first and second mirror layers 22, 23. As a consequence, different wavelengths of light are detected for the respective channels of the light-receiving unit 32 in the light detection substrate 30A.

In the spectroscopic sensor 1A, as explained in the foregoing, the first filter region 24 of the interference filter unit 20A is optically separated by the separators 15 as seen in the Z axis, while the separators 15 extend from the cavity layer 21 to both of the first and second mirror layers 22, 23. This restrains light from propagating along the X axis in the cavity layer 21 even when a structure for restricting the incident angle of light incident on the interference filter unit 20A is not employed separately from the separators 15, whereby the crosstalk of light in the interference filter unit 20A can fully be suppressed. The separators 15 reaching the second mirror layer 23 can restrain stray light from occurring due to multireflection and interference of light between the second mirror layer 23 and the light-receiving surface 32a of the light detection substrate 30A. In addition, the separators 15 restrict the incident angle of light incident on the light-receiving surface 32a of the light detection substrate 30A, whereby light can be made incident on the light-receiving surface 32a accurately at a predetermined position corresponding to the incident position of the interference filter unit 20A. Hence, this spectroscopic sensor 1A can improve filter characteristics. Restricting the incident angle also allows the light incident on the interference filter unit 20A to become closer to collimated light, whereby the interference filter unit 20A can attain sharper transmission characteristics.

The spectroscopic sensor 1A restrains light from propagating along the X axis in the cavity layer 21, for example, on a par with or more than the case where a structure for restricting the incident angle of light incident on the interference filter unit 20A is employed separately from the separators 15. This makes it unnecessary to employ the structure for restricting the incident angle of light incident on the interference filter unit 20A separately from the separators 15, whereby the thickness and cost of the spectroscopic sensor 1A can be reduced.

The separators 15 reach the first coupling layer 3 through the second mirror layer 23 (reach the light-receiving surface 32a of the light detection substrate 30A in the spectroscopic sensor 1A). While this can restrain stray light from occurring due to multireflection and interference of light between the second mirror layer 23 and the light-receiving surface 32a, the separators 15 more strictly restrict the incident angle of light incident on the light-receiving surface 32a, whereby the light can be made incident on the light-receiving surface 32a accurately at a predetermined position corresponding to the incident position of the interference filter unit 20A.

While the distance between the first and second mirror layers 22, 23 varies, the distance between the end part 15a of the separator 15 and the light-receiving surface 32a of the light detection substrate 30A and the distance between the end part 15b of the separator 15 and the light-receiving surface 32a of the light detection substrate 30A are fixed. This can homogenize collimating characteristics of the separators 15 for restricting the incident angle of light.

The separators 15 extend such as to traverse the light-receiving surface 32a of the light detection substrate 30A as seen in the Z axis. This makes it possible to detect appropriately-dispersed light (i.e., light having a narrow wavelength range and less stray light components) in the whole region of the light-receiving surface 32a.

The antireflection film 34 for preventing light incident on the light-receiving surface 32a of the light detection substrate 30A from being reflected is arranged between the interference filter unit 20A and the light detection substrate 30A. This structure also contributes to restraining stray light from occurring due to multireflection and interference of light between the second mirror layer 23 and the light-receiving surface 32a and eventually to improving filter characteristics.

The restriction on the incident angle of light by the separators 15 will now be explained. As illustrated in FIG. 4, letting d be the distance between the separators 15, 15 adjacent to each other, and h be the height of the separators 15, the maximum value of incident angle θ (incident angle within the XY plane) of light transmittable through the interval between the separators 15, 15 adjacent to each other is represented by the following expression (1). This makes it possible to set the aspect ratio of the separators 15 and the like according to the permissible maximum value of incident angle θ.

$$\theta=90°-\tan^{-1}(h/d)=\tan^{-1}(d/h) \quad (1)$$

Figure 5:
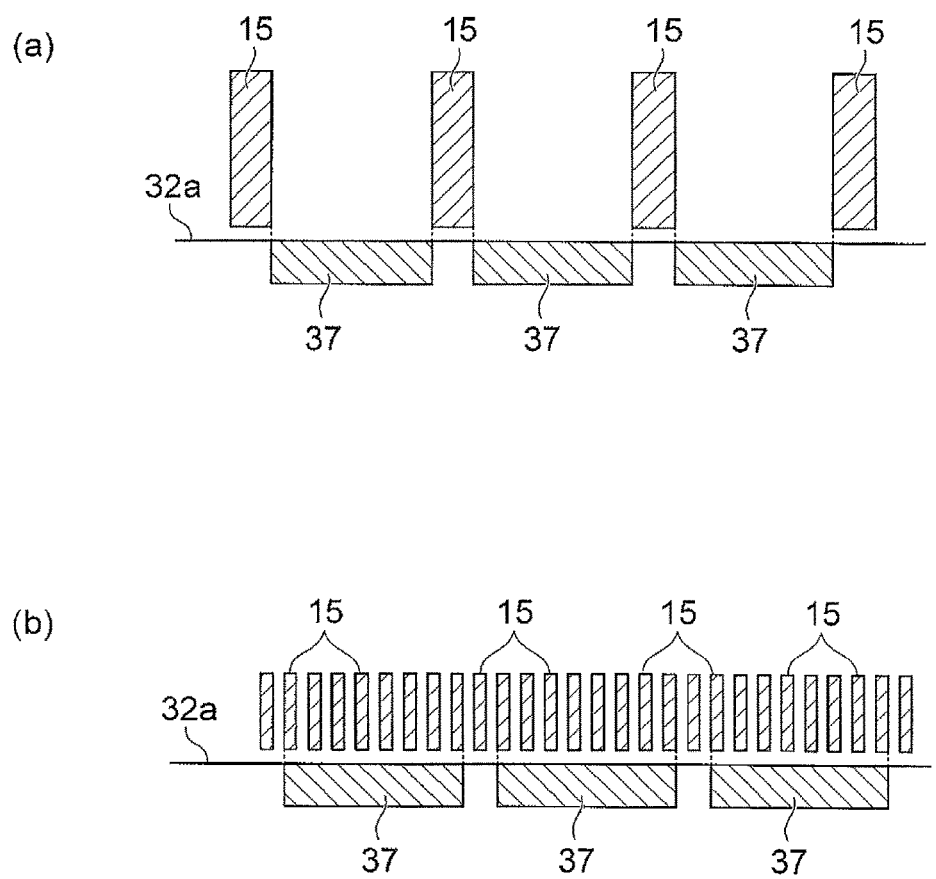
FIG. 5 is a set of diagrams illustrating relationships between pixels of a light-receiving unit and a separator in the spectroscopic sensor of FIG. 1.

The separators 15 may be formed so as to correspond to regions between pixels 37, 37 adjacent to each other in the light-receiving unit 32 of the light detection substrate 30A as illustrated in FIG. 5(*a*) or such that they correspond at least one by one to the pixels 37 in addition to these regions as illustrated in FIG. 5(*b*). The configuration of FIG. 5(*a*) can restrain the light-receiving sensitivity in the light-receiving unit 32 from lowering. In the configuration of FIG. 5(*b*), on the other hand, the distance between the separators 15, 15 adjacent to each other becomes shorter, whereby the maximum value of incident angle of light transmittable through the interval between the separators 15, 15 adjacent to each other can be restrained from increasing even when the height of the separators 15 is made lower (see the above-mentioned expression (1)).

A method for manufacturing the above-mentioned spectroscopic sensor 1A will now be explained. The following steps may be performed by using a wafer formed with a plurality of members corresponding to respective spectroscopic sensors 1A, such that the wafer is finally diced into the spectroscopic sensors 1A, each constructed by the light detection substrate 30A having the interference filter unit 20A bonded thereto.

Figure 6:
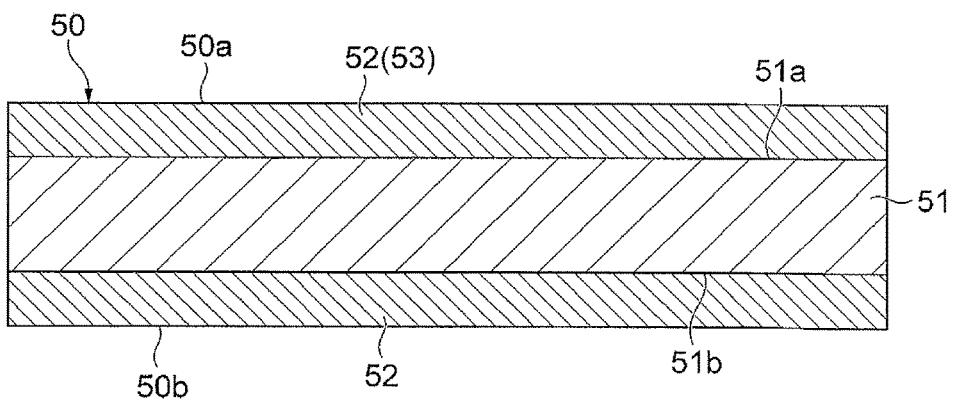
FIG. 6 is a set of vertical sectional views for explaining a method for manufacturing the spectroscopic sensor of FIG. 1.
Figure 6:
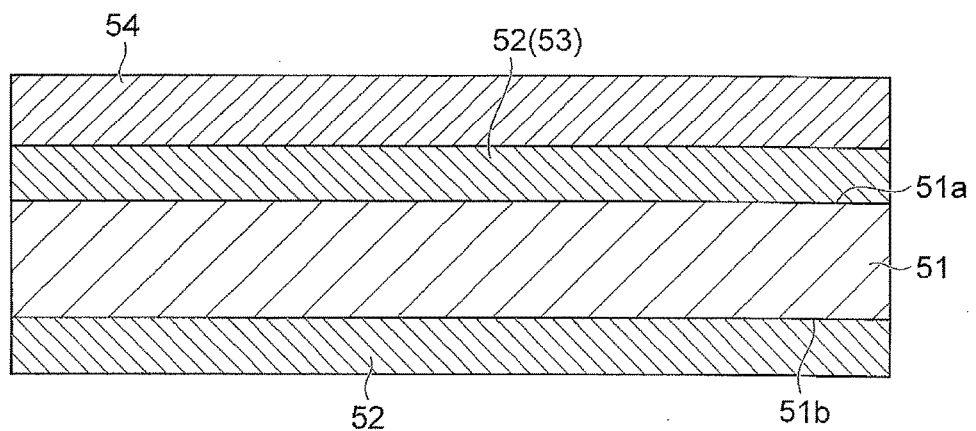

First, as illustrated in FIG. 6(*a*), principal surfaces 50*a*, 50*b* of a silicon substrate 50 are thermally oxidized, so as to form silicon oxide films 52 on principal surfaces 51 *a*, 51*b* of a handle substrate 51 made of silicon, and the silicon oxide film 52 formed on one of the principal surfaces 51 *a*, 51*b* of the handle substrate 51 is employed as a surface layer 53. Here, the silicon oxide film 52 formed on one principal surface 51*a* of the handle substrate 51 is assumed to be the surface layer 53.

Figure 7:
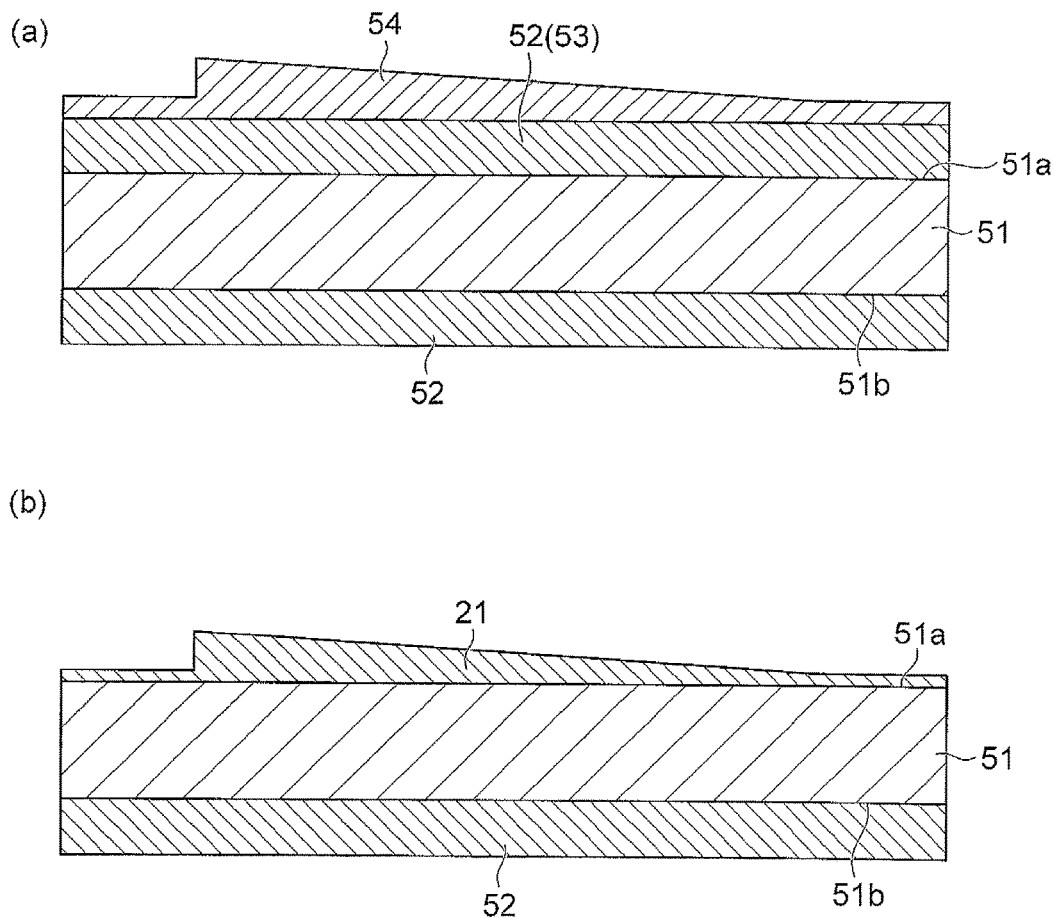
FIG. 7 is a set of vertical sectional views for explaining the method for manufacturing the spectroscopic sensor of FIG. 1.

Subsequently, a resist layer 54 is applied onto the surface layer 53 as illustrated in FIG. 6(*b*) and then is patterned as illustrated in FIG. 7(*a*) in order to form the cavity layer 21 by etching. Thereafter, as illustrated in FIG. 7(*b*), the surface layer 53 disposed on the handle substrate 51 is etched (etched back) through the resist layer 54 serving as a mask, so as to form the cavity layer 21.

Figure 8:
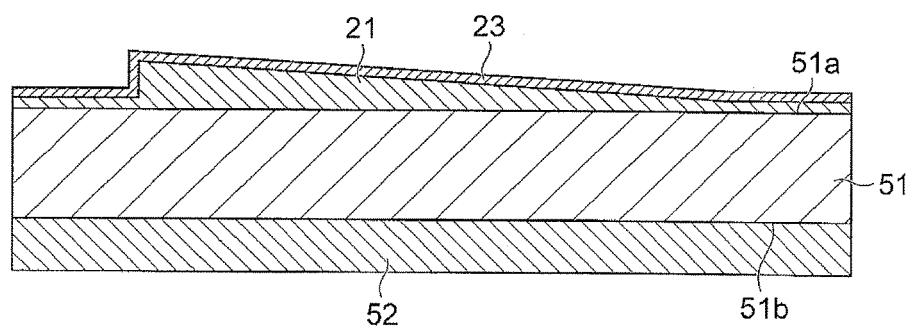
FIG. 8 is a set of vertical sectional views for explaining the method for manufacturing the spectroscopic sensor of FIG. 1.
Figure 8:
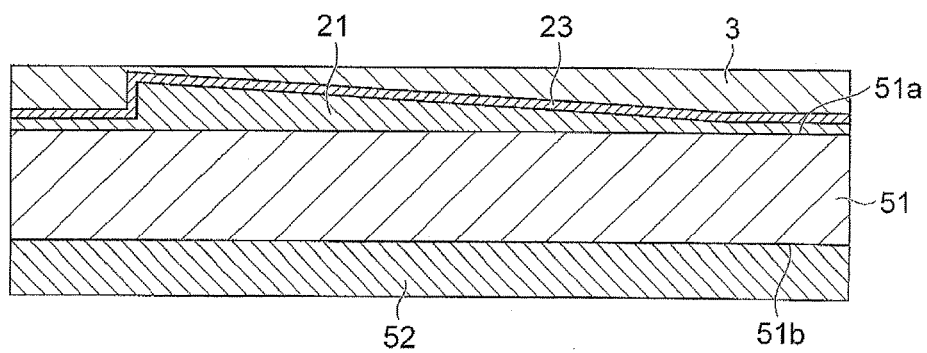

Next, as illustrated in FIG. 8(*a*), the second mirror layer 23 is formed on the cavity layer 21. When forming the second mirror layer 23, a film is formed by ion plating, vapor deposition, sputtering, or the like. When necessary, photoetching and liftoff, or patterning by etching is also performed. Subsequently, as illustrated in FIG. 8(*b*), a silicon oxide film is formed so as to cover the second mirror layer 23, and its surface is planarized by CMP, so as to form the first coupling layer 3.

Figure 9:
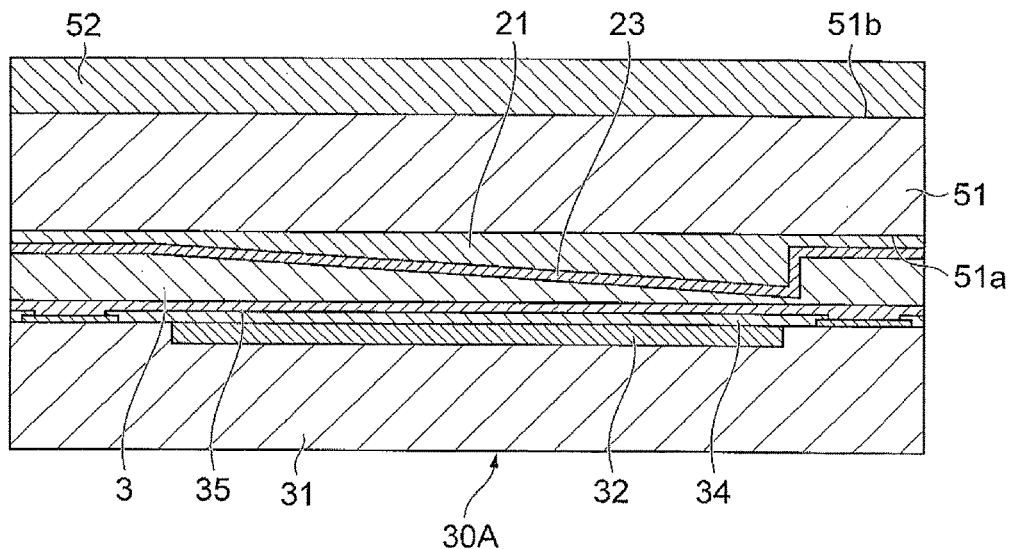
FIG. 9 is a set of vertical sectional views for explaining the method for manufacturing the spectroscopic sensor of FIG. 1.
Figure 9:
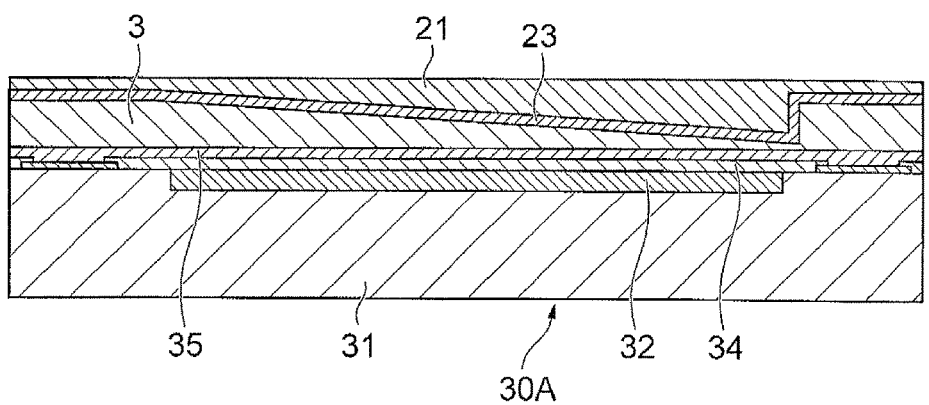

Then, as illustrated in FIG. 9(*a*), the surface of the coupling layer 3 is directly bonded (by surface-activated bonding or the like) to the surface of the planarization layer 35 of the light detection substrate 30A. Subsequently, as illustrated in FIG. 9(*b*), grinding, polishing, etching, and the like are performed, so as to remove the silicon oxide film 52 and handle substrate 51.

Figure 10:
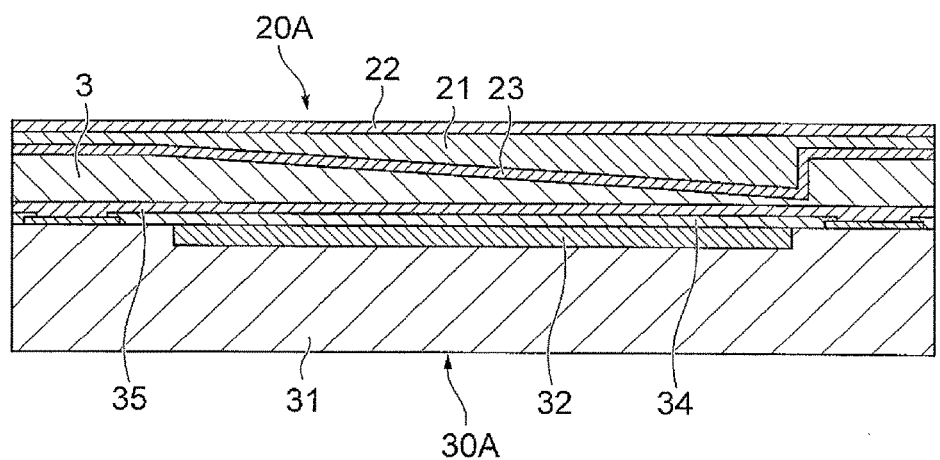
FIG. 10 is a set of vertical sectional views for explaining the method for manufacturing the spectroscopic sensor of FIG. 1.
Figure 10:
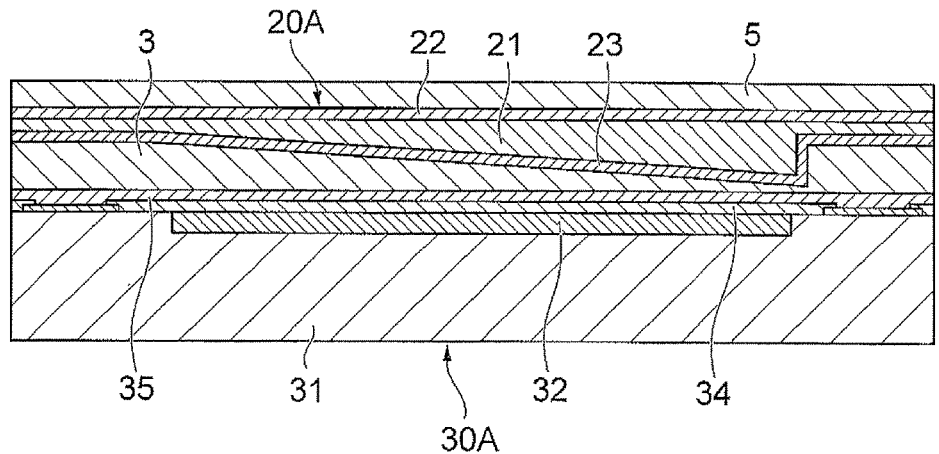

Thereafter, as illustrated in FIG. 10(*a*), the first mirror layer 22 is formed as with the second mirror layer 23 on the cavity layer 21 exposed by removing the handle substrate 51. This makes the first and second mirror layers 22, 23 oppose each other through the cavity layer 21, thereby forming the interference filter unit 20A. Subsequently, as illustrated in FIG. 10(*b*), the protective film 5 is formed on the first mirror layer 22.

Figure 11:
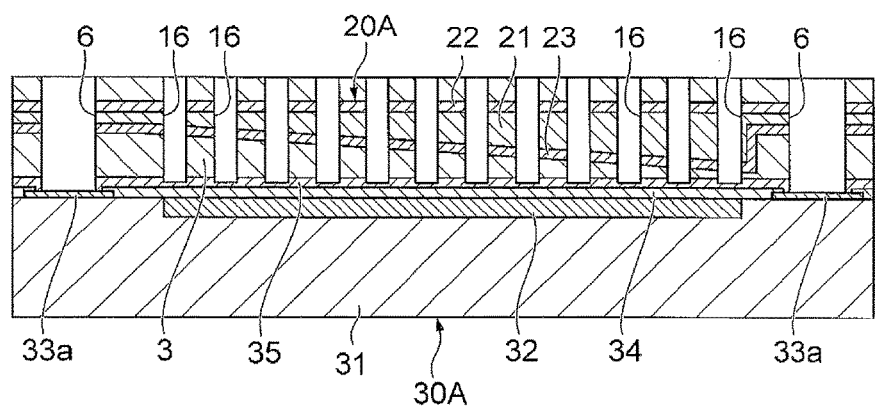
FIG. 11 is a set of vertical sectional views for explaining the method for manufacturing the spectroscopic sensor of FIG. 1.
Figure 11:
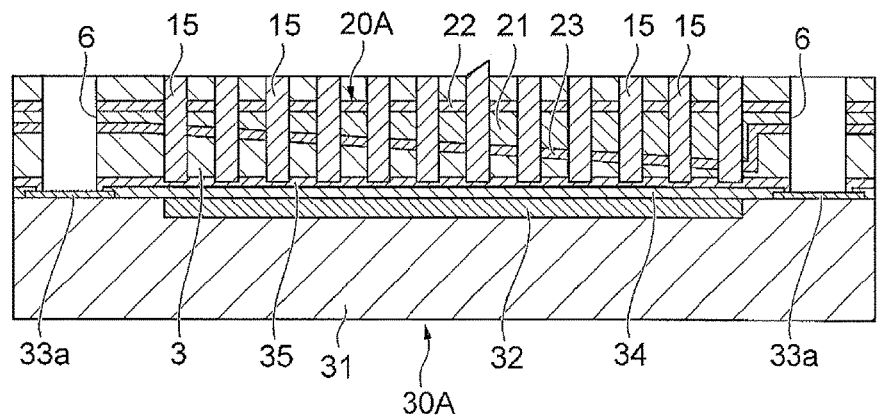

Next, as illustrated in FIG. 11(*a*), parts corresponding to the pad units 33*a* and parts to be formed with the separators 15 in the light detection substrate 30A are etched, so as to form the through holes 6 and slits 16. Though the surface of the protective film 5 is also etched at this time, the thickness of the protective film 5 may be set by taking it into account beforehand, whereby the first mirror layer 22 and the like can be prevented from being damaged by etching.

Subsequently, as illustrated in FIG. 11(*b*), the slits 16 are filled with a light-absorbing, reflecting, or shielding material, so as to form the separators 15, and the surface of the protective film 5 and end parts of the separators 15 are planarized by CMP when necessary. The separators 15 may also be formed by coating the inner surfaces of the slits 16 with the light-absorbing, reflecting, or shielding material.

Then, as illustrated in FIG. 1, the light detection substrate 30A having the interference filter unit 20A bonded thereto is secured to the bottom wall 2*a* of the package 2. Thereafter, one end of the wire 7 is connected to the pad unit 33*a* through the through hole 6, while the other end of the wire 7 is connected to the pad unit 8 through the bottom wall 2*a* of the package 2, so as to yield the spectroscopic sensor 1A.

Figure 12:
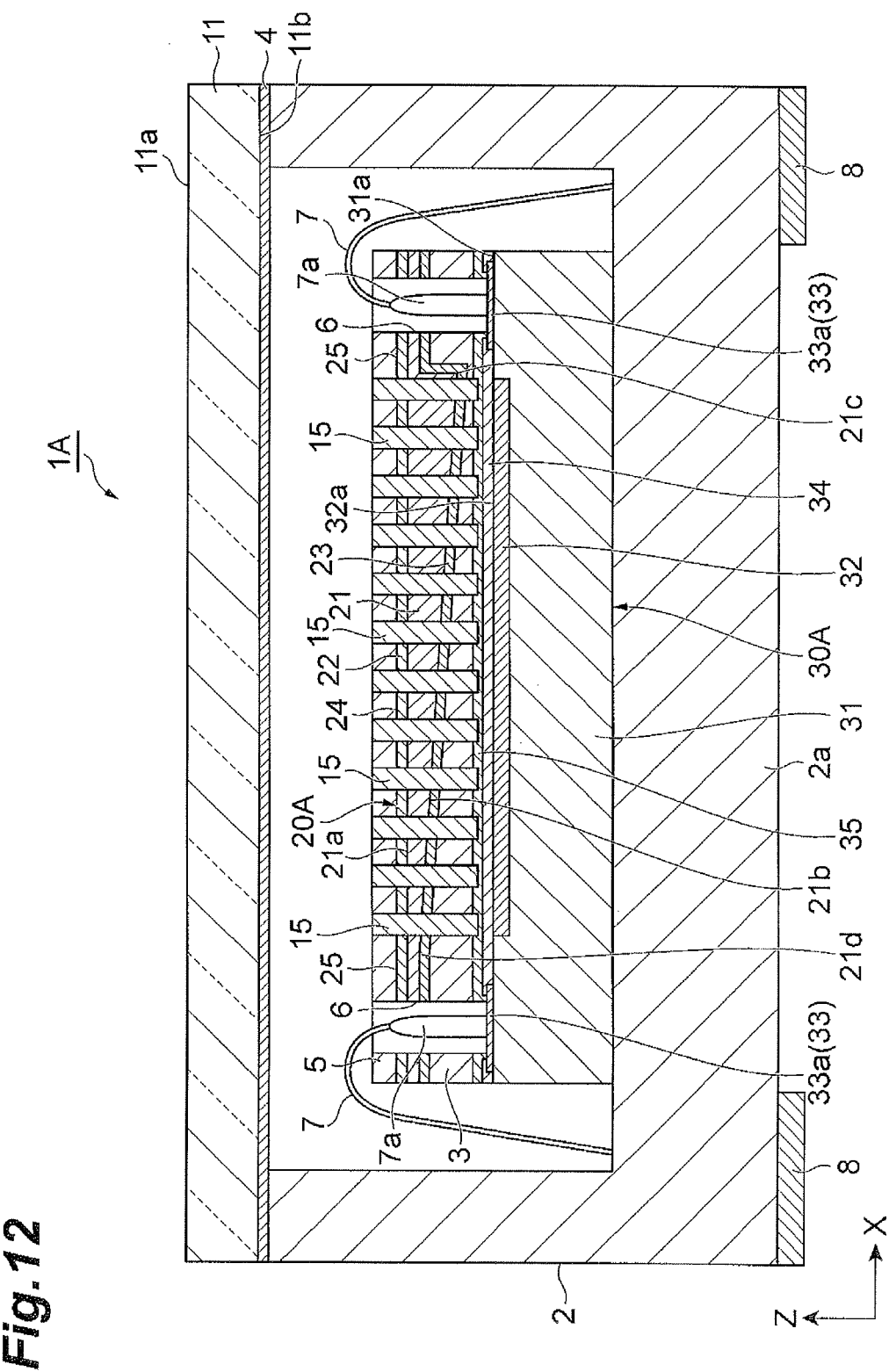
FIG. 12 is a vertical sectional view of a modified example of the spectroscopic sensor of FIG. 1.

As illustrated in FIG. 12, a light-transmitting substrate 11 may be attached to the opening of the package 2 in the spectroscopic sensor 1A in accordance with the first embodiment. For example, the light-transmitting substrate 11 is made of glass or the like and has a thickness on the order of several hundreds of μm to several mm. An optical filter layer 4 may also be formed on at least one of the front face 11*a* and rear face 11*b* of the light-transmitting substrate 11. For example, the optical filter layer 4 is a dielectric multilayer film or organic color filter (color resist) and has a thickness on the order of several tens of nm to several tens of Color glass or filter glass which can transmit therethrough a predetermined wavelength range of light may also be used as a material for the light-transmitting substrate 11.

Figure 13:
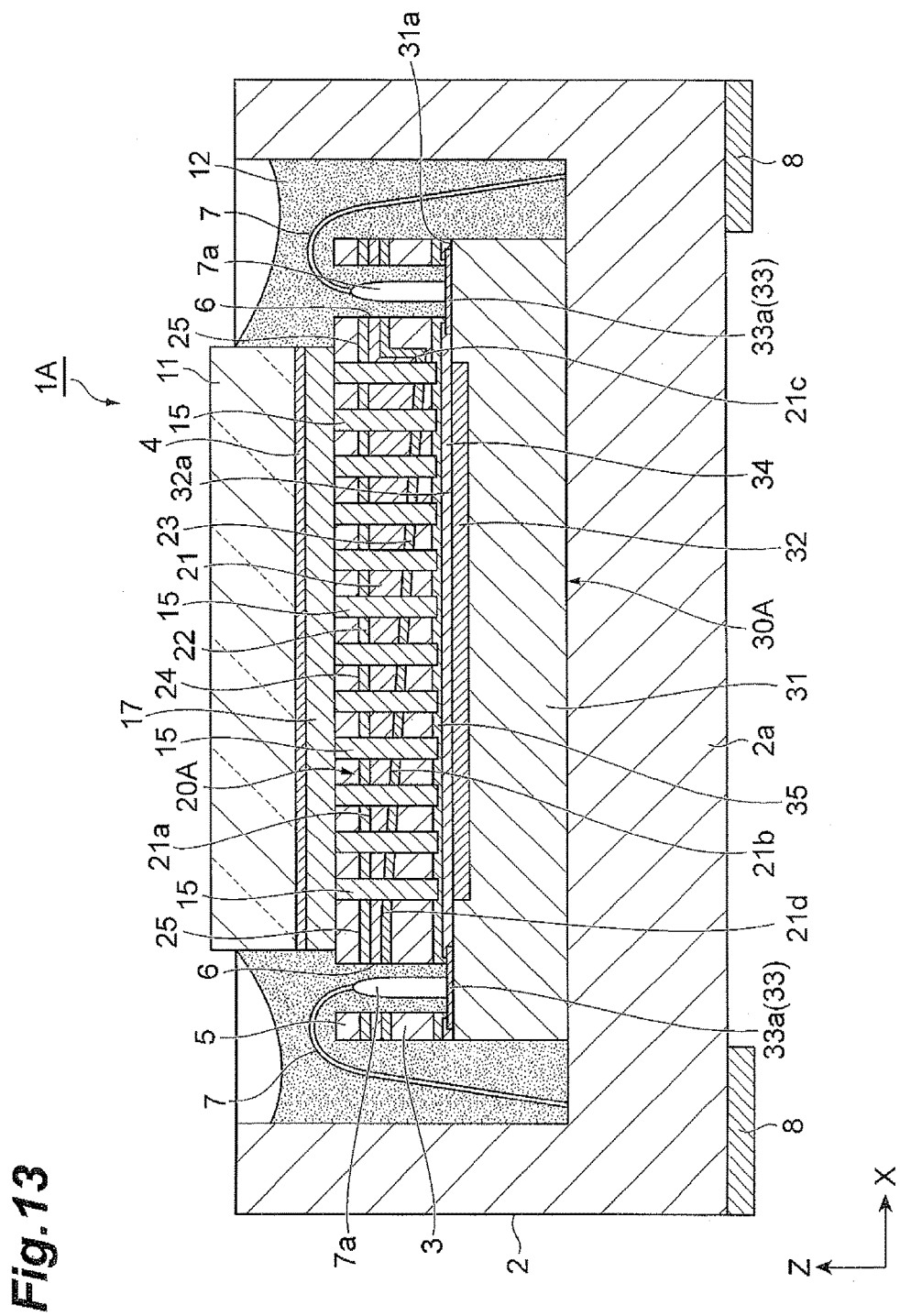
FIG. 13 is a vertical sectional view of a modified example of the spectroscopic sensor of FIG. 1.

As illustrated in FIG. 13, the light-transmitting substrate 11 formed with the optical filter layer 4 may be joined onto the protective film 5 with an optical resin material 17. Interstices between the light detection substrate 30 and interference filter unit 20A and inner surfaces of side walls of the package 2 may be filled with a light-absorbing resin material 12. This structure can more securely prevent noise light from entering the first filter region 24. In all of the modes of the spectroscopic sensor 1A, the protective film 5 may be omitted.

The package 2 may lack side walls and be shaped into an SMD (Surface Mount Device) package in which the light detection substrate 30A is mounted on a PC board or the like and sealed by transfer molding with a light-transmitting resin or the like, for example.

Second Embodiment

Figure 14:
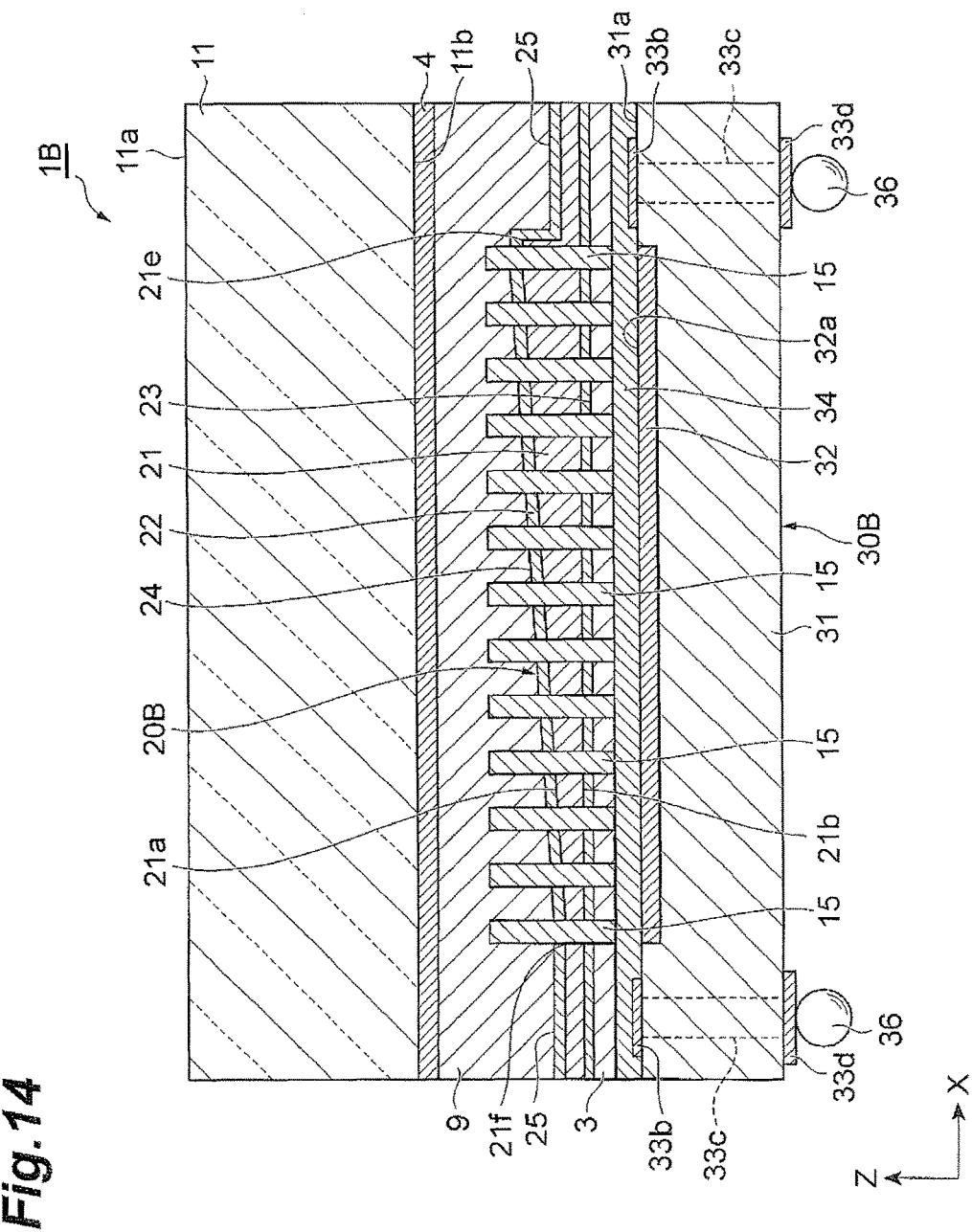
FIG. 14 is a vertical sectional view of the spectroscopic sensor in accordance with a second embodiment of the present invention.

As illustrated in FIG. 14, a spectroscopic sensor 1B of the second embodiment differs from the spectroscopic sensor 1A of the first embodiment constructed as the SMD mainly in that it is constructed as a CSP (Chip Size Package). In the following, the spectroscopic sensor 1B of the second embodiment will be explained mainly in terms of differences from the spectroscopic sensor 1A of the first embodiment.

In the spectroscopic sensor 1B, the light-receiving unit 32 of the light detection substrate 30B is formed in a part including the surface 31 *a* in the semiconductor substrate 31.

The semiconductor substrate 31 is formed with surface leads 33b, through-hole leads 33c, and rear leads 33d as the leads for inputting and outputting electric signals with respect to the light-receiving unit 32, while the rear leads 33d are provided with bump electrodes 36 for surface mounting.

In the spectroscopic sensor 1B, an interference filter unit 20B is formed on the antireflection film 34 of the light detection substrate 30B with the first coupling layer 3 interposed therebetween. The interference filter unit 20B has a cavity layer 21 and first and second mirror layers 22, 23 opposing each other through the cavity layer 21. The interference filter unit 20B is an LVF which selectively transmits therethrough a predetermined wavelength range of light according to its incident position from the first mirror layer 22 side to the second mirror layer 23 side.

The interference filter unit 20B has a first filter region 24 and a second filter region 25. The first filter region 24 corresponds to the light-receiving surface 32a of the light detection substrate 30 as seen in the Z axis. The second filter region 25 surrounds the first filter region 24 like a ring as seen in the Z axis.

The front face 21a of the cavity layer 21 in the first filter region 24 tilts with respect to the XY plane such that one end 21e in the X-axis direction of the front face 21a is separated from the plane including the light-receiving surface 32a more than is the other end 21f in the X-axis direction of the front face 21a. On the other hand, the rear face 21b of the cavity layer 21 in the first filter region 24 is parallel to the XY plane.

The front face 21a and rear face 21b of the cavity layer 21 in the second filter region 25 are parallel to the XY plane. The distance from the plane including the light-receiving surface 32a to the front face 21a of the cavity layer 21 in the second filter region 25 equals the distance from the plane including the light-receiving surface 32a to the other end 21f of the front face 21a of the cavity layer 21 in the first filter region 24. On the other hand, the distance from the plane including the light-receiving surface 32a to the rear face 21b of the cavity layer 21 in the second filter region 25 equals the distance from the plane including the light-receiving surface 32a to the rear face 21b of the cavity layer 21 in the first filter region 24.

As in the foregoing, the cavity layer 21 is formed continuously over the first and second filter regions 24, 25. The front face 21a of the cavity layer 21 has a difference in level between the first and second filter regions 24, 25 which becomes the largest at one end 21e and the smallest (0 here) at the other end 21f. On the other hand, the rear face 21b of the cavity layer 21 is flush in the first and second filter regions 24, 25.

The first mirror layer 22 is formed continuously on the front face 21a of the cavity layer 21 and the vertical surfaces of the difference in level over the first and second filter regions 24, 25. On the other hand, the second mirror layer 23 is formed continuously on the rear face 21b of the cavity layer 21 over the first and second filter regions 24, 25. Hence, the distance between the first and second mirror layers 22, 23 varies in the first filter region 24. The distance between the first and second mirror layers 22, 23 is fixed in the second filter region 25.

In the spectroscopic sensor 1B, the light-transmitting substrate 11 having the optical filter layer 4 formed on the rear face 11b is joined onto the interference filter unit 20B with a second coupling layer 9 interposed therebetween. The light-transmitting substrate 11 transmits therethrough light incident on the interference filter unit 20B. Between the light-transmitting substrate 11 and the interference filter unit 20B, the second coupling layer 9 transmits therethrough light advancing from the light-transmitting substrate 11 to the interference filter unit 20B. The second coupling layer 9 is made of the same material as with the cavity layer 21. For example, the second coupling layer 9 is a silicon oxide film formed by film-forming processing using TEOS as a material gas and has a thickness on the order of several tens of nm to several tens of μm.

In the spectroscopic sensor 1B, each separator 15 extends from the cavity layer 21 into the second coupling layer 9 through the first mirror layer 22. On the other hand, each separator 15 extends from the cavity layer 21 to the rear face (surface on the light-receiving surface 32a) of the first coupling layer 3 (i.e., onto the antireflection film 34) through the second mirror layer 23. The distance between the end part 15a of each separator 15 and the light-receiving surface 32a is fixed. Similarly, the distance between the end part 15b of each separator 15 and the light-receiving surface 32a is fixed.

When light is incident on the spectroscopic sensor 1B constructed as in the foregoing, only a predetermined wavelength range of light to be incident on the first filter region 24 of the interference filter unit 20B in the light passing through the light-transmitting substrate 11 is transmitted through the optical filter layer 4. The light transmitted through the optical filter layer 4 passes through the second coupling layer 9, so as to be made incident on the first filter region 24, which transmits therethrough the predetermined wavelength range of light according to its incident position. The light transmitted through the first filter region 24 passes through the first coupling layer 3 and antireflection film 34, so as to be made incident on the light-receiving surface 32a of the light detection substrate 30B. Here, the wavelength range of light incident on each channel of the light-receiving unit 32 of the light detection substrate 30B is determined uniquely by the thickness of the cavity layer 21 at the incident position and the materials and thicknesses of the first and second mirror layers 22, 23. As a consequence, different wavelengths of light are detected for the respective channels of the light-receiving unit 32 in the light detection substrate 30B.

In the spectroscopic sensor 1B, as explained in the foregoing, the first filter region 24 of the interference filter unit 20B is optically separated by the separators 15 as seen in the Z axis, while the separators 15 extend from the cavity layer 21 to both of the first and second mirror layers 22, 23. Hence, as with the above-mentioned spectroscopic sensor 1A, the spectroscopic sensor 1B can improve filter characteristics.

In the spectroscopic sensor 1B, the separators 15 extend through the first mirror layer 22 to the second coupling layer 9 arranged between the light-transmitting substrate 11 and the interference filter unit 20B. This allows the separators 15 to restrict the incident angle of light incident on the interference filter unit 20B, whereby crosstalk can be suppressed more in the interference filter unit 20B. Restricting the incident angle of light incident on the interference filter unit 20B also allows the light incident on the interference filter unit 20B to become closer to collimated light, whereby the interference filter unit 20B can attain sharper transmission characteristics.

In the spectroscopic sensor 1B, the cavity layer 21 and second coupling layer 9 are made of the same material. This can easily achieve a step of stacking the cavity layer 21 and second coupling layer 9. When providing the separators 15 by dry etching, for example, the same condition can be employed for etching gases and the like, whereby the separators 15 can be attained with a high form accuracy. Since they have the same refractive index, stable filter characteristics can also be obtained. This can also homogenize collimating characteristics of the separators 15 for restricting the incident angle of light.

Figure 15:
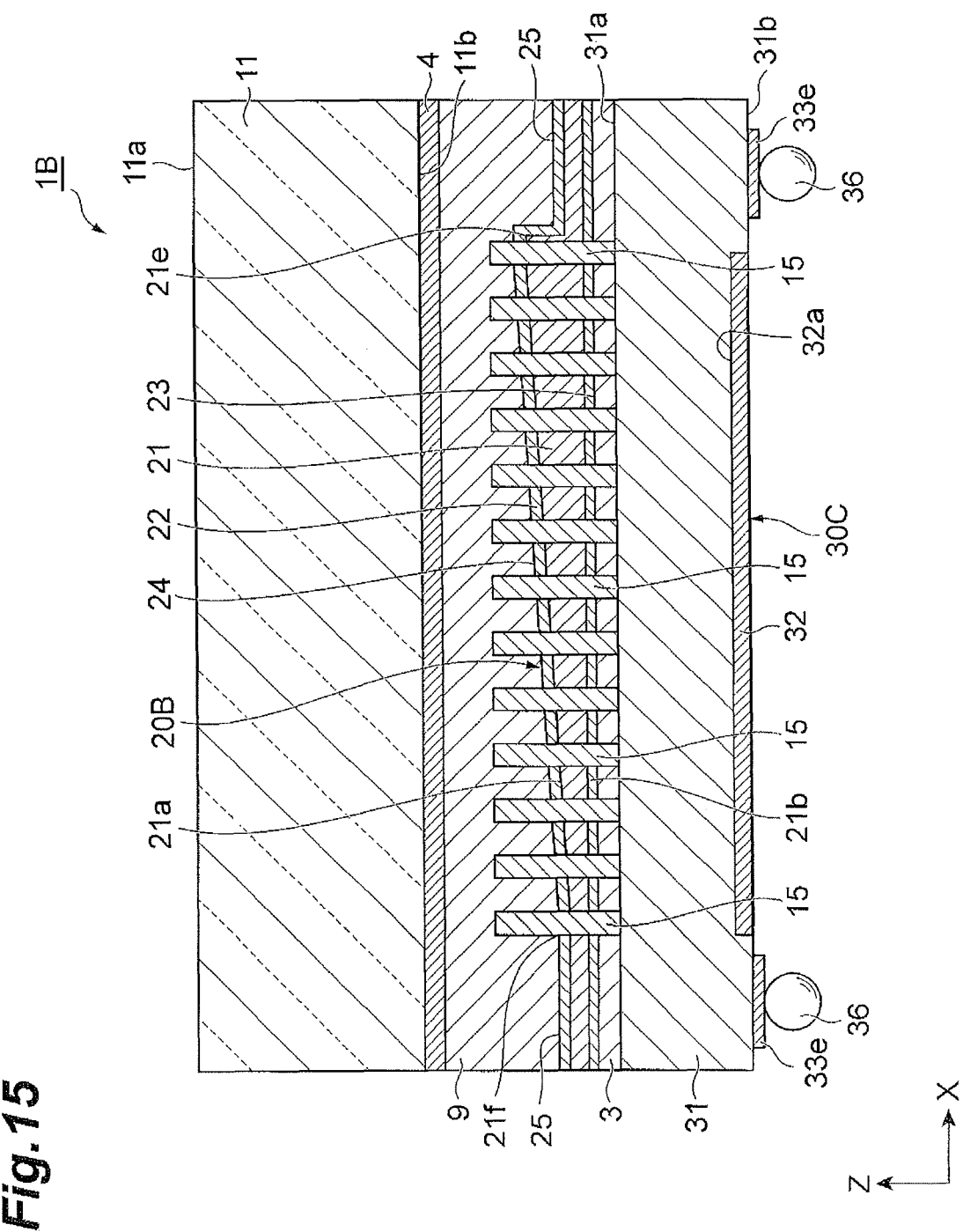
FIG. 15 is a vertical sectional view of a modified example of the spectroscopic sensor of FIG. 14.

The spectroscopic sensor 1B of the second embodiment may use a back-illuminated light detection substrate 30C as illustrated in FIG. 15. In the back-illuminated light detection substrate 30C, the light-receiving unit 32 is formed in a part including the rear face 31b in the semiconductor substrate 31, while the surface of the light-receiving unit 32 on the side opposite from the light-receiving surface 32a is shielded from light. As the leads 33 for inputting and outputting electric signals with respect to the light-receiving unit 32, rear leads 33e are formed, while the rear leads 33e are provided with bump electrodes 36 for surface mounting. Thus, the back-illuminated light detection substrate 30C requires no through-hole electrodes and the like, whereby the cost of the spectroscopic sensor 1B can be cut down.

Finally, effects of the spectroscopic sensors 1A, 1B in accordance with the first and second embodiments will be explained with reference to FIG. 16. FIG. 16 is a set of graphs illustrating relationships between the wavelength of light and the signal intensity outputted from spectroscopic sensors irradiated with emission lines at 820 nm, 860 nm, 900 nm, 940 nm, and 980 nm, in which FIG. 16(a) indicates those of the spectroscopic sensors 1A, 1B of the first and second embodiments, while FIG. 16(b) indicates those of spectroscopic sensors excluding the separators 15 from the spectroscopic sensors 1A, 1B of the first and second embodiments (hereinafter referred to as "separator-free spectroscopic sensors"). As illustrated in FIGS. 16(a) and 16(b), the wavelength range of dispersed light is narrower in the spectroscopic sensors 1A, 1B of the first and second embodiments than in the separator-free spectroscopic sensors. This is because the separators 15 suppress crosstalk of light in the interference filter units 20A, 20B, thereby achieving a narrow bandwidth filter transmission characteristic. Stray light components are less in the spectroscopic sensors 1A, 1B of the first and second embodiments than in the separator-free spectroscopic sensors. This is because, in addition to the fact that the crosstalk of light in the interference filter units 20A, 20B is suppressed by the separators 15, stray light is restrained from occurring due to multireflection and interference of light between the second mirror layer 23 and the light-receiving surface 32a of the light detection substrate 30A, 30B.

While the first and second embodiments of the present invention are explained in the foregoing, the present invention is not limited thereto. For example, constituent members of the spectroscopic sensor may employ various materials and forms without being restricted to those mentioned above. By way of example, the cavity layer may be made of materials such as $TiO_2$, $Ta_2O_5$, SiN, Si, Ge, $Al_2O_3$, and light-transmitting resins. A material for the first and second mirror layers may be a metal film constituted by Al, Au, Ag, or the like having a thickness on the order of several nm to several μm. The first and second coupling layers may be made of a light-transmitting resin or the like. The sizes of the constituent members of the spectroscopic sensor are illustrated by way of example only. By "fixed" in the present invention and embodiments is meant not only completely fixed but also substantially fixed within ranges of errors in manufacture and the like. The same holds for "same", "parallel", "perpendicular", "equal" "flush", and the like.

In the first filter region of the interference filter unit, the thickness of the cavity layer may vary two-dimensionally (not only along the X axis but also along the Y axis) or stepwise. The light detection substrate is not limited to the one-dimensional sensor but may be a two-dimensional sensor. The separators may optically separate the interference filter unit in a two-dimensional manner as seen in the Z axis. For example, the separators may extend not only along the Y axis but also along the X axis, so as to form a lattice as a whole.

It is sufficient for the separators to optically separate the interference filter unit as seen in a predetermined direction intersecting the light-receiving surface of the light detection substrate. However, the structure of the spectroscopic sensor can be simplified by employing separators which optically separate the interference filter unit as seen in a direction perpendicular to the light-receiving surface. The separators are not limited to those extending from the cavity layer to both of the first and second mirror layers. That is, it is sufficient for the separators to extend from the cavity layer to at least one of the first and second mirror layers. This can also fully suppress the crosstalk of light in the interference filter unit, make light incident on the light-receiving surface of the light detection substrate accurately at a predetermined position corresponding to the incident position of the interference filter unit, and improve filter characteristics. However, the separators extending from the cavity layer to at least the second mirror layer can restrain stray light from occurring due to multireflection and interference of light between the second mirror layer and the light-receiving surface of the light detection substrate, thereby further improving filter characteristics.

It is sufficient for the separators to separate at least a part of the cavity layer in the direction perpendicular to the light-receiving surface. It is also sufficient for the separators reaching the first mirror layer to separate at least a part of the first mirror layer in the direction perpendicular to the light-receiving surface. Similarly, it is sufficient for the separators reaching the second mirror layer to separate at least a part of the second mirror layer in the direction perpendicular to the light-receiving surface.

The surface of the light detection substrate on the interference filter unit side may be provided with antireflection processing, instead of the antireflection film, for preventing light incident on the light-receiving surface from being reflected. Examples of the antireflection processing include surface roughening such as black silicon processing and nanopillar structures. This can also restrain stray light from occurring due to multireflection and interference of light between the second mirror layer and the light-receiving surface of the light detection substrate, thereby further improving filter characteristics.

The interference filter unit may have a plurality of first filter regions. In this case, the second filter region may be formed for each first filter region or a plurality of first filter regions so as to surround the same.

For joining the light detection substrate and the interference filter unit to each other, bonding with an optical resin material or at an outer edge part of the spectroscopic sensor may be employed. Examples of optical resin materials usable for bonding include organic materials of epoxy, acrylic, and silicone types and hybrid materials composed of organic and inorganic substances. The bonding at the outer edge part of the spectroscopic sensor may be done with low-melting glass, solder, or the like while holding a gap with a spacer. In this case, the area surrounded by the bonding part may be left as an air gap or filled with an optical resin material.

INDUSTRIAL APPLICABILITY

The present invention can provide a spectroscopic sensor which can improve filter characteristics.

REFERENCE SIGNS LIST 1A, 1B: spectroscopic sensor; 3: first coupling layer; 9: second coupling layer; 11: light-transmitting substrate; 15: separator; 15a, 15b: end part; 20A, 20B: interference filter unit; 21: cavity layer; 22: first mirror layer; 23: second mirror layer; 30A, 30B, 30C: light detection substrate; 32a: light-receiving surface; 34: antireflection film

The invention claimed is:

1. A spectroscopic sensor comprising:
    an interference filter unit, having a cavity layer and first and second mirror layers opposing each other through the cavity layer, for selectively transmitting therethrough a predetermined wavelength range of light according to an incident position thereof from the first mirror layer side to the second mirror layer side;
    a light detection substrate, having a light-receiving surface for receiving the light transmitted through the interference filter unit, for detecting the light incident on the light-receiving surface;
    a separator, extending from the cavity layer to at least one of the first and second mirror layers, for optically separating the interference filter unit as seen in a predetermined direction intersecting the light-receiving surface;
    the interference filter unit has a first region in which the distance between the first and second mirror layers varies, and a second region surrounding the perimeter of the first region as seen in the predetermined direction; and
    the cavity layer is formed continuously over the first and second regions and the cavity layer is a solid body.

2. A spectroscopic sensor according to claim 1, wherein the separator extends from the cavity layer to at least the second mirror layer.

3. A spectroscopic sensor according to claim 2, wherein the separator extends from the cavity layer to both of the first and second mirror layers.

4. A spectroscopic sensor according to claim 1, further comprising a first coupling layer, arranged between the interference filter unit and the light detection substrate, for transmitting therethrough light advancing from the interference filter unit to the light detection substrate;
    wherein the separator reaches the first coupling layer through the second mirror layer.

5. A spectroscopic sensor according to claim 1, further comprising:
    a light-transmitting substrate for transmitting therethrough the light incident on the interference filter unit; and
    a second coupling layer, arranged between the light-transmitting substrate and the interference filter unit, for transmitting therethrough the light advancing from the light-transmitting substrate to the interference filter unit;
    wherein the separator reaches the second coupling layer through the first mirror layer.

6. A spectroscopic sensor according to claim 5, wherein the cavity layer and second coupling layer are made of the same material.

7. A spectroscopic sensor according to claim 1, wherein the distance in the predetermined direction between the first and second mirror layers varies;
    wherein the distance in the predetermined direction between an end part on the light-receiving surface side of the separator and the light-receiving surface is fixed; and
    wherein the distance in the predetermined direction between an end part of the separator on the side opposite from the light-receiving surface and the light-receiving surface is fixed.

8. A spectroscopic sensor according to claim 1, wherein the separator exists such as to traverse the light-receiving surface as seen in the predetermined direction.

9. A spectroscopic sensor according to claim 1, further comprising an antireflection film, arranged between the interference filter unit and the light detection substrate, for preventing the light incident on the light-receiving surface from being reflected.

10. A spectroscopic sensor according to claim 1, wherein the surface on the interference filter unit side of the light detection substrate is provided with antireflection processing for preventing the light incident on the light-receiving surface from being reflected.

11. A spectroscopic sensor according to claim 1, wherein the predetermined direction is a direction perpendicular to the light-receiving surface.

* * * * *